US007028915B2

(12) United States Patent
Uzkan

(10) Patent No.: US 7,028,915 B2
(45) Date of Patent: Apr. 18, 2006

(54) LAYOVER HEATING SYSTEM FOR A LOCOMOTIVE

(75) Inventor: Teoman Uzkan, Indian Head Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 102 days.

(21) Appl. No.: 10/476,133

(22) PCT Filed: Apr. 27, 2002

(86) PCT No.: PCT/US02/13289

§ 371 (c)(1), (2), (4) Date: Oct. 25, 2003

(87) PCT Pub. No.: WO02/087950

PCT Pub. Date: Nov. 7, 2002

(65) Prior Publication Data

US 2004/0140366 A1 Jul. 22, 2004

Related U.S. Application Data

(60) Provisional application No. 60/287,117, filed on Apr. 27, 2001.

(51) Int. Cl.
*B60H 1/02* (2006.01)

(52) U.S. Cl. .......................... 237/12.3 B; 237/12.3 R; 165/41; 165/42

(58) Field of Classification Search .......... 237/12.3 B, 237/12.3 R, 2 A; 165/41, 42; 123/142.5 E
See application file for complete search history.

(56) References Cited

U.S. PATENT DOCUMENTS

| | | | | |
|---|---|---|---|---|
| 3,966,119 | A * | 6/1976 | Harter et al. | 237/12.3 B |
| 4,711,204 | A * | 12/1987 | Rusconi | 123/142.5 R |
| 5,350,114 | A * | 9/1994 | Nelson et al. | 237/2 A |
| 5,906,177 | A * | 5/1999 | Okabe et al. | 122/26 |
| 5,954,266 | A * | 9/1999 | Hoshino et al. | 237/12.3 R |
| 6,394,361 | B1 * | 5/2002 | Fridmann et al. | 237/8 A |
| 6,474,561 | B1 * | 11/2002 | Maruyama | 237/70 |

* cited by examiner

*Primary Examiner*—Derek S. Boles
(74) *Attorney, Agent, or Firm*—Cook, Alex, McFarron, Manzo, Cummings & Mehler, Ltd.

(57) ABSTRACT

A layover heating system (89) for a locomotive is provided. The layover heating system (89) is adapted to be used in conjunction with a conventional locomotive cooling systems. The layover heating system (89) includes a water tank and pump (90). A layover heater (92) heats fluid in the layover heating system (89). An orifice (98) is provided to control the flow Of fluid in the layover system (89) to generally balance the pressure on either side of the locomotive radiator. In this manner, fluid flow through the radiator is minimized, minimizing heat loss at the radiator. A variable orifice may be used that is adjustable in response to a signal generated from pressure sensors on each side of the radiator and processed by a central processing unit.

15 Claims, 8 Drawing Sheets

LAYOVER HEATING SYSTEM FOR A LOCOMOTIVE

CROSS-REFERENCE TO RELATED APPLICATIONS

This application claims the benefit of U.S. Provisional Application No. 60/287,117 filed Apr. 27, 2001.

FIELD OF THE INVENTION

The present invention relates to a heating system for a locomotive. More specifically, the present invention relates to a layover heating system for a locomotive.

BACKGROUND OF THE INVENTION

In most modern diesel-electric locomotives, the diesel engine drives the electric generators which in turn powers the electric motors that drive the locomotive wheels. The engine is typically a turbocharged diesel engine with turbochargers and aftercoolers. Every diesel electric locomotive has an engine cooling system.

The engine cooling system circulates the liquid coolant through the engine cooling loop to remove heat from the engine for two major reasons: (1) To keep the temperatures of the engine parts within allowable limits for reliability and durability and (2) to remove the heat from the incoming engine air (at the compressor output) to reduce the airbox air temperature which decrease the fuel consumption and reduce emissions.

In all present day engine cooling systems, a liquid coolant takes the heat from the engine (liners, heads, oil coolers, etc.), carries it to the radiators and discharges the heat to the surrounding air (or to sea water in marine applications). The coolant is usually a mixture of (a) water, (b) water-glycol solutions. There are two types of glycols used in these applications: (a) ethylene glycol and (b) propylene glycol. One of the characteristics of the glycols is their reduction of the freezing point of the water. Hence, the main purpose of using glycols is to reduce the freezing point of the coolant below the expected minimum temperature that the locomotive will encounter and thus reduce the freeze damage to components such as radiators. The higher the glycol percent, the lower the freezing point of the mixture. For example, the water freezes at 32° F., but the 50-50 mixture of the water and propylene glycol freezes at about −36° F. Hence, water-glycol mixtures are used extensively to protect freezing of the engine coolant at low ambient temperatures.

Locomotive operation requires special attention at very low ambient air temperatures. When the engine is operating at high loads, it transfers enough heat to the coolant so that there is no possibility for the coolant to freeze. On the other hand, if the heat transferred to the coolant is low and the ambient air temperature is low, there can be a possibility for the coolant to freeze. This is not desirable as it can create freeze-damage on components, particularly on radiators. Therefore, a number of special precautions are taken to prevent the freezing of the coolant as described hereafter.

A. Engine Idling: The engine may be run at an idle speed when the ambient temperature is low and the locomotive is not moving. This will keep the engine and coolant temperatures at a level that the engine can develop enough heat (and power) to keep the water temperatures above a safe minimum value. This alternative ensures the proper operation of the engine but has undesirable characteristics. First, idling consumes fuel even when the locomotive is not in use. In some business case studies, the cost of fuel consumed in idle operation for one year is estimated to be larger than the cost of developing alternative systems. Second, idling reduces the effective life of the engine.

B. Radiator Draining: When the engine is shut down, the water or coolant may be drained from the radiators completely to the water tank to eliminate freezing in the radiator tubes and damage them. This option requires large water tanks to hold the coolant volume in the radiators and connecting pipes. Almost all cooling systems that use water as coolant have this draining feature. This is commonly referred to as a "Dry Radiator" system. If the radiators are not drained, then it is referred to as a "Wet Radiator" system.

C. Layover System: In some locomotives, there is a system that is called the "Layover System". This system enables shut down of the engine at cold ambient temperatures. Usually an electric heater (or other heat source) supplies the heat necessary to keep engine component temperatures at a minimum level so that the start-up of the engine is possible when desired.

D. Combined System: In another system, a combination of the above alternatives can be used. The following examples will be helpful in describing basic features of these alternative systems.

(1) Parking Locomotive Inside: With a dry radiator system, when the locomotive is parked inside a locomotive housing for overnight, the engine can be stopped. The coolant in the radiator is then drained and the engine components are kept at normal inside the building temperatures for start up the next morning. Parking the locomotive inside a heated building is limited by the available buildings. In most cases, it is not a practical solution.

(2) Parking Outside with Inside Heating: With a dry radiator system, the engine can be parked at outside, water is drained to the tank. At very cold nights, the engine coolant and oil temperatures can be lower than the engine start-up temperatures. So next morning, the locomotive is pulled and parked inside a heated building until temperatures reach up to start-up temperatures. This option also is not desirable by railroads as warming up the locomotive inside the building takes a long time. Moreover, a suitable building is not available in most locations.

(3) Start and Stop System: In this case, the locomotive is parked outside in cold weather. There is a system on the locomotive such that it automatically starts the engine when the coolant temperature goes below a predetermined level, and stops the engine when the coolant temperature reaches a maximum value. This way, the possibility of engine freeze is eliminated and the start-up of the engine is ensured the next day.

The start and stop alternative does not require any building or similar structure. It is part of the locomotive design and feature. However, it has two major drawbacks, namely, (a) it still requires the operation of the large locomotive engine (which is costly and reduces engine life), and (b) it is noisy and creates noise pollution. Starting and operating the locomotive engine at an urban environment, particularly during night hours, is restricted by local ordinances. Therefore, railroads specify certain conditions on layover systems precluding the start and stop option.

(4) Layover System with Dry Radiators (LSDR): With a dry radiator system, the engine is stopped but enough heat is supplied to coolant through a layover system (usually with an electric heater connected to an outside electric source). The coolant is circulating through engine and oil cooler but not through the radiators. This system is usually identified as the "Layover System with Dry Radiators."

(5) Layover System with Wet Radiators (LSWR): With a wet radiator system, the engine is stopped but enough heat is supplied to coolant through a layover system as before. However, the coolant is circulating through the engine, oil cooler and the radiators. This system will be identified as the "Layover System with Wet Radiators." In this case, the heat loss at the radiators will be higher than those of the LSDR system.

Before describing the proposed layover system, it is useful to describe the reasons for heating different engine and cooling system components. These are covered in this section. There are two major liquids used in locomotive diesels today. The engine coolant and engine oil. Any one or both of these liquids may be used to heat the engine during a layover period at low ambient air temperatures with forced or natural circulation modes.

Heating the engine oil is important for a number of reasons. The pour point of engine oils is high. As an example, the pouring point of SAE 40 oil is about −12° C. (or about 10.4° F.) (Ref: Material Safety Data Sheet # 1268, for Chevron Delo-6000 SAE 40 oil). If the oil temperature is permitted to go below this value, oil behaves like a soft plastic and will not flow. Therefore, it would not be possible to start the engine.

Moreover, the viscosity of oil goes up to a very high value at low temperatures, i.e., the viscosity of SAE 40 oil is 100 saybolds at 210° F. Corresponding values for 60 and 0° F. are about 7000 and 500,000 saybolds (Marks Mechanical Engineering Handbook, Sixth Edition, pp. 6–230, FIG. 1). The commonly recommended minimum oil temperature for engine start-up is about 40–50° F. Hence, heating the oil is a necessity for a reasonable sized, particularly an electric start-up system. The size, weight and cost of engine start-up systems go up very rapidly with decreasing start-up temperature.

Heating the oil directly with an electric heater has some limitations. As the heat conductance of the oil is low, the local temperature on the surface of the electric heater becomes very high. If this is permitted, it will start the oxidation of the oil even at low temperatures and consequently reduce the oil life to unacceptable levels. To prevent this oxidation, the heating rate (watt density) of the electric heater should be kept at a very low level. This in turn would increase the size of the electric heater necessary to do the job and become impractical. Hence, direct electric heating of oil is not utilized, but the engine coolant is heated by an electric heater, and the warm engine coolant transfers the necessary amount of heat to oil at the conventional oil cooler.

Heating the oil is usually done by forced circulation of the oil through the oil cooler and the engine. This will also assure proper lubrication as well as heating of surfaces that oil gets in contact with. When the engine is started, the bearings and the liner-ring interface already have the oil layer. This will reduce the power requirement for start-up, and the use of a smaller start-up system can be possible. Hence, oil heating is necessary to reduce the engine start-up power.

Forced convection of warm oil also heats the piston and the rings and therefore controls the clearance between the rings and piston at cold start conditions. This is important to bring the wear rate of the rings and liners. Hence, oil heating is also necessary for durability and reliability of the engine.

Heating the engine coolant is necessary for several reasons:

a) To control the proper clearance at engine liners. With decreasing ambient temperature, the liner will shrink and reduce the clearance between the liner and piston (rings). If the engine is started with liners that are at a temperature below a permissible low value, this will cause excessive wear and tear both on the rings and the liner. It will require a much higher start-up power and increase the size and cost of the starting system. It may also cause liner scuffing.

b) If the coolant is permitted to freeze, particularly within radiator tubes and liner passages, it may cause permanent damage to the tubes and other components.

c) At low enough temperatures, the water-glycol mixtures behave like a jelly and would not flow as easily. Hence, the coolant pump operation can be hindered at the start-up if the coolant temperatures are permitted to be too low.

d) The combustibility of the fuel injected into the engine cylinder depends on the air temperature in the cylinder. Heating the engine coolant will in turn heat the liner and through the liner, the air trapped in the cylinder. If the coolant is not heated, and at low ambient air temperatures, the fuel may not combust and starting the engine may not be possible.

e) At some low ambient temperatures, the fuel is not burned completely, leading to phenomena called "white smoke". Heating the engine coolant tends to reduce and eliminate the engine white smoke and start-up emissions.

The heating of engine coolant and oil is necessary at low ambient air temperature conditions. An engine layover system is used to satisfy this need. At some applications where the ambient temperature becomes very cold, heating the locomotive cab also becomes an important issue for the crew. As a result, the locomotive cab heating system may be combined with the engine layover system to keep the engine as well as the locomotive cab temperatures within desirable limits.

SUMMARY OF THE INVENTION

The present invention relates to a layover heating system for a locomotive engine adapted for connection with a locomotive cooling system. The locomotive cooling system includes a water tank, an engine, a radiator and an oil cooler. The layover heating system comprises a pump for circulating fluid from the water tank. A layover heater is in fluid communication with the pump. At least one check valve is in fluid communication with the layover heater. The layover heating system also includes an orifice for controlling the flow of fluid in the layover heating system.

A layover, heating method for a locomotive engine adapted for use in connection with a locomotive cooling system having a water tank, an engine, a radiator and an oil cooler is also provided. The method comprises pumping fluid from the water tank through a layover heater. The fluid in the heater is then heated. The heated fluid is provided then to the engine and to the oil cooler. An orifice for controlling the flow of fluid to minimize fluid flow through the radiator is provided.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
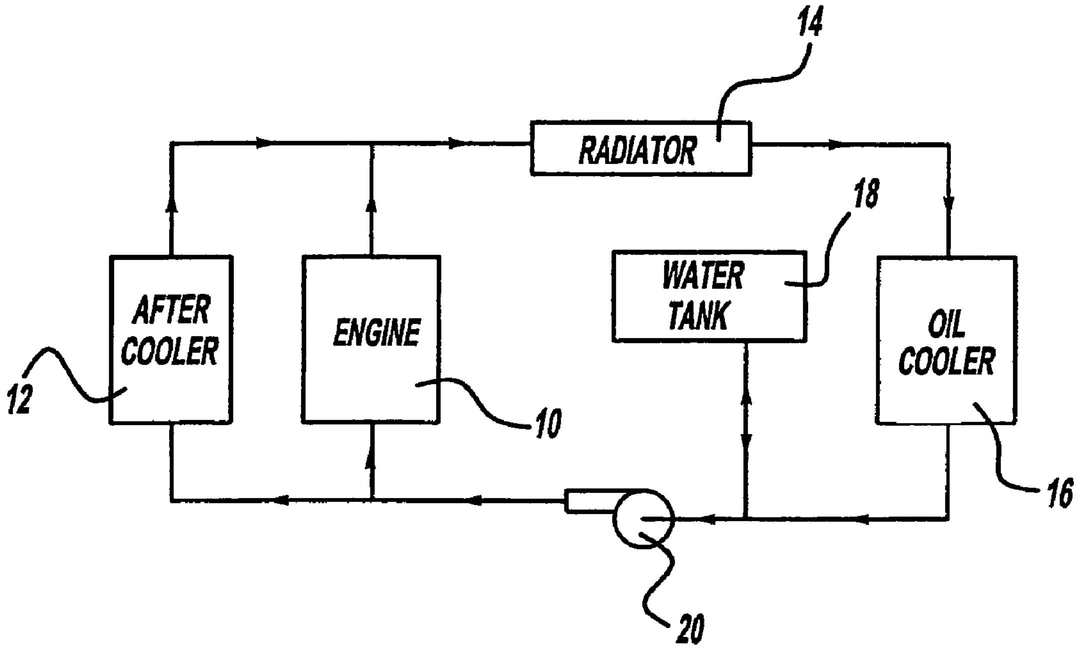
Figure - 1 Prior Art
FIG. 1 is a schematic view of a prior art locomotive cooling system.

In FIG. 1, the schematic arrangement of a conventional cooling system for a locomotive diesel engine is shown. These systems were used extensively up to about 1980s. The cooling pump circulates the coolant in the direction of the arrows through the engine 10 (and a parallel aftercooler 12), through the radiators 14 and the oil cooler 16. A water tank 18 supplies the water to the system and maintains pressure head to the water pump 20. Other engine components in need of heating or cooling by the engine water (such as air compressor, fuel oil preheater, etc.) can be installed on this loop at appropriate locations. An important characteristic of this system is the fact that the coolant temperature at the inlet of the engine is the same as at the inlet to the aftercooler core. This limits the amount of air cooling at the aftercooler.

Figure 2:
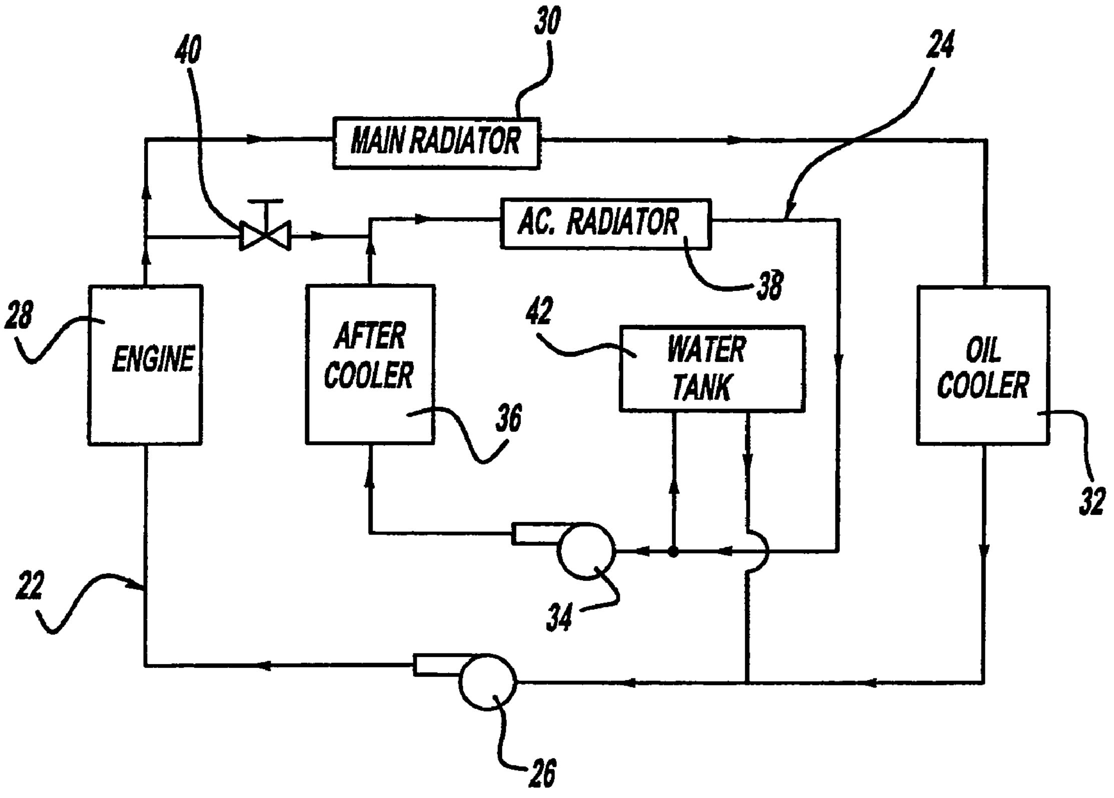
Figure - 2 Prior Art
FIG. 2 is a schematic view of an alternate prior art SAC locomotive cooling system.

FIG. 2 is a schematic illustration of the so-called Separate Aftercooling System (SAC). There are two coolant loops in this system, an engine coolant loop 22 and an aftercooler loop 24. Coolant flow through the loops is indicated by the arrows. In the engine coolant loop 22, a pump 26 circulates the coolant through the engine 28, the engine radiator 30 and the oil cooler 32. In the aftercooler loop 24, a second pump 34 circulates the coolant through the aftercooler cores 36 and aftercooler radiators 38. The engine loop 22 coolant is hotter than the aftercooler loop 24 coolant. Their respective temperatures can be as 180 and 135° F., respectively. A link valve 40 joins the coolant between these loops 22, 24. When the link valve 40 opens, the hotter engine-loop 22 coolant flows through the link valve 40 to the colder aftercooler loop 24. To compensate this water flow, the same amount of cold aftercooler coolant flows to the water tank 42 and from there to the main engine coolant loop 22. This flow through the link valve 40 generates a mechanism of heat transfer from the main engine coolant loop 22 to the aftercooler loop 24. When main radiator 30 can cool the engine 28, the link valve 40 is closed and aftercooler loop 24 coolant temperature (and the airbox air temperature) can be made very low. When the main radiator 30 cannot cool the engine 28, the link valve 40 is opened and the excess heat is transferred to the aftercooler loop 36. In such a case, the aftercooler loop 24 coolant temperature becomes higher. An increase in the flow through the link valve 40 increases the temperature of the coolant in the aftercooler loop 24.

The important feature of this system is that the coolant temperature at the inlet of the aftercooler can be much cooler than the coolant temperature at the engine inlet. This system can cool the engine inlet air to a much lower value, which in turn reduces fuel consumption and decreases engine emissions.

Another feature of the SAC system is the ability to allocate the cooling capacity of the aftercooler radiator 38 to cool the aftercooler loop 24 only or to cool the aftercooler coolant as well as the main loop 22 coolant that flows through the link valve 40.

Figure 3A:
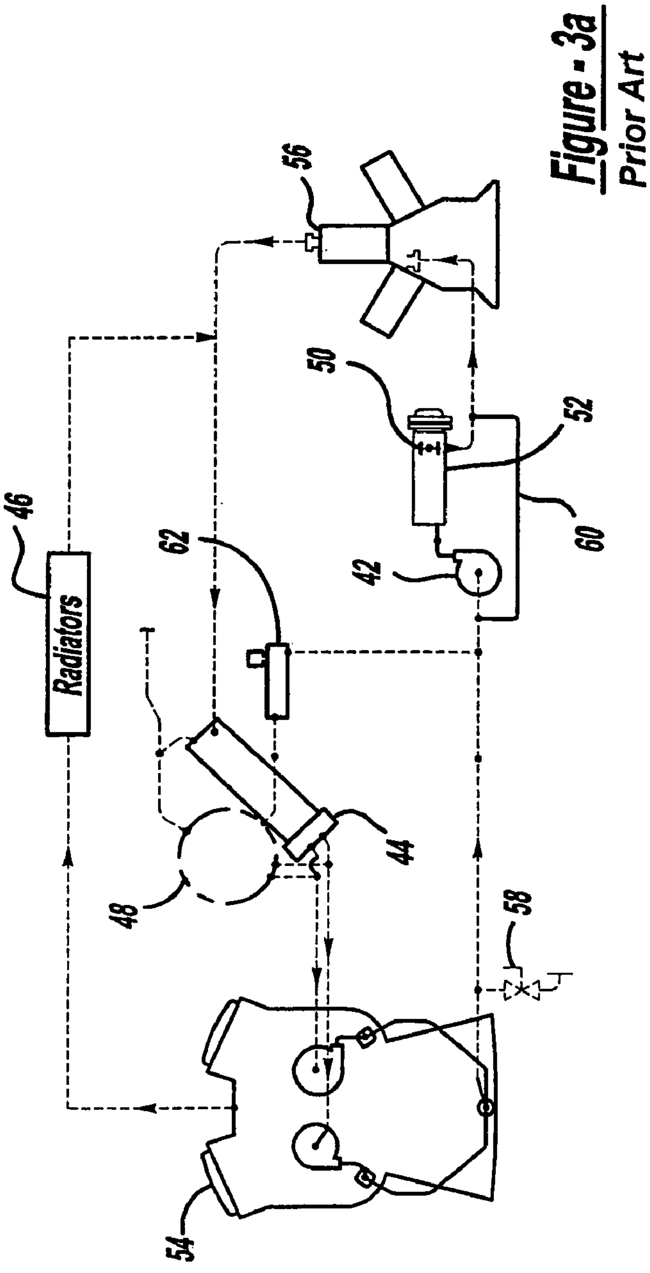
Figure - 3a Prior Art
FIGS. 3*a* and 3*b* are schematic views of an alternate prior art locomotive cooling system.
Figure 3B:
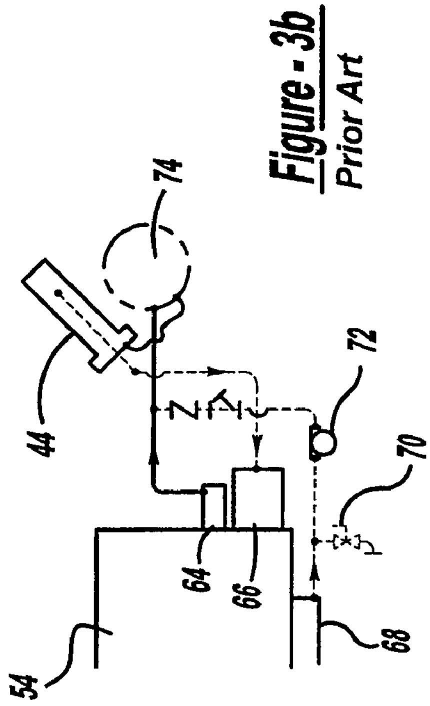
Figure - 3b Prior Art

FIGS. 3*a* and 3*b* are schematic diagrams of a layover system where the water is heated by an immersion electric heater. The coolant has forced circulation with a water pump 42. The oil is heated at the oil cooler 44 through heat transfer from warm engine 54 cooling water to colder oil. In this system, the radiators 46 are drained completely to the water tank 48 so it is a dry radiator system. A temperature sensor 50 senses the temperature of the coolant so that heater 52 current can be turned on and off. The system may also include an air compressor 56. As shown in FIG. 3*a*, an engine and air compressor drain 58 and a drain bypass 60 may also be included. A temperature switch 62 may also be provided. FIG. 3*b* also shows a scavenging pump 64, oil strainer 66, engine oil sump 68, and engine oil drain 70. A standby oil pump 72 and oil filter 74 are also shown.

Figure 4:
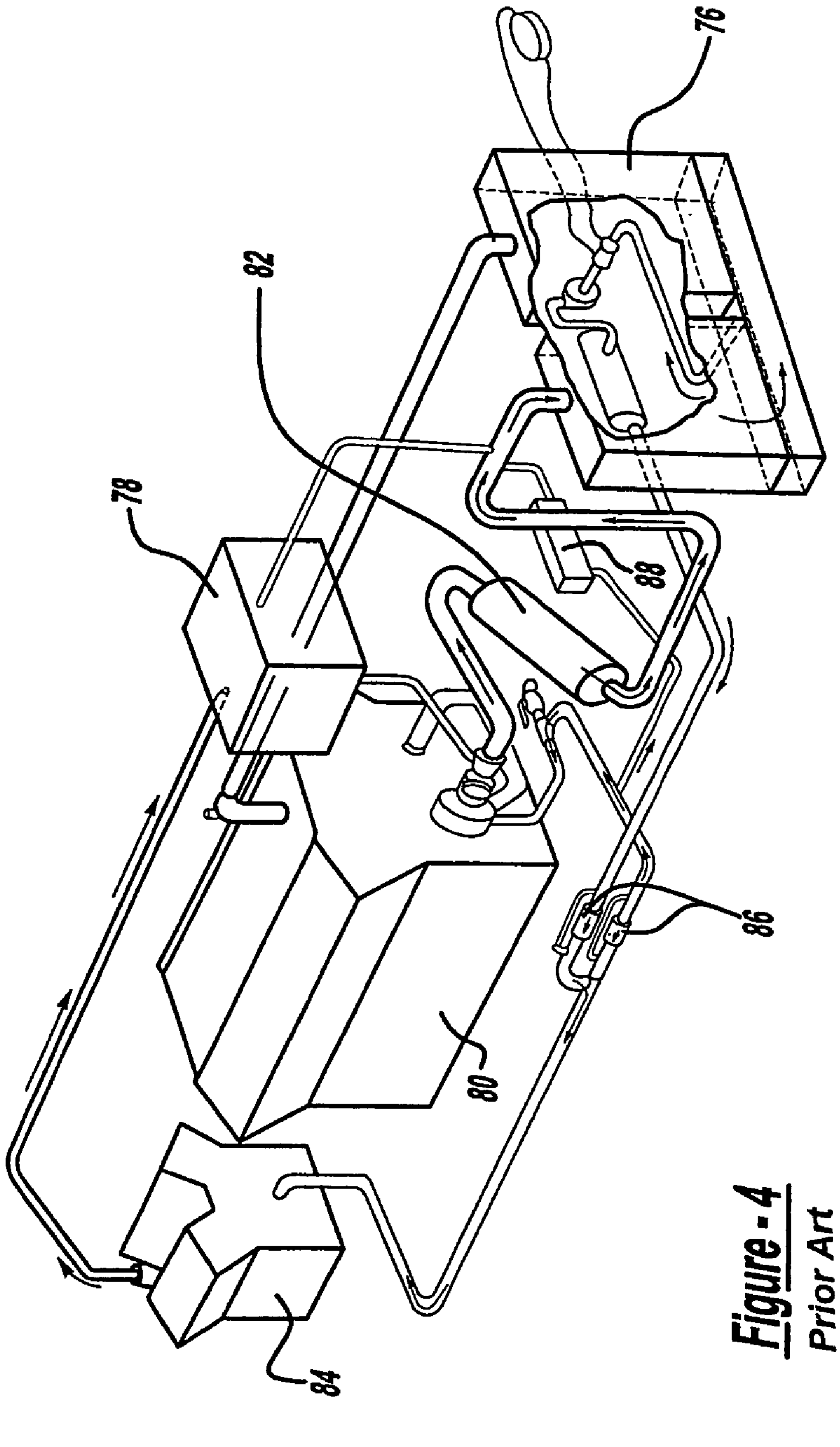
Figure - 4 Prior Art
FIG. 4 is a perspective view of a locomotive layover system with a wet-type radiator.

FIG. 4 is a perspective drawing of a locomotive layover system with a wet-type radiator. Coolant flow is in the direction of the arrows. In this system, the radiators 76 are not drained. The water tank 78 is only a make-up tank to keep the cooling system filled with water always. The system shown includes an engine 80 and oil cooler 82. An air compressor 84 is also provided. Check valves 86 and a temperature switch 88 is also provided.

Figure 5:
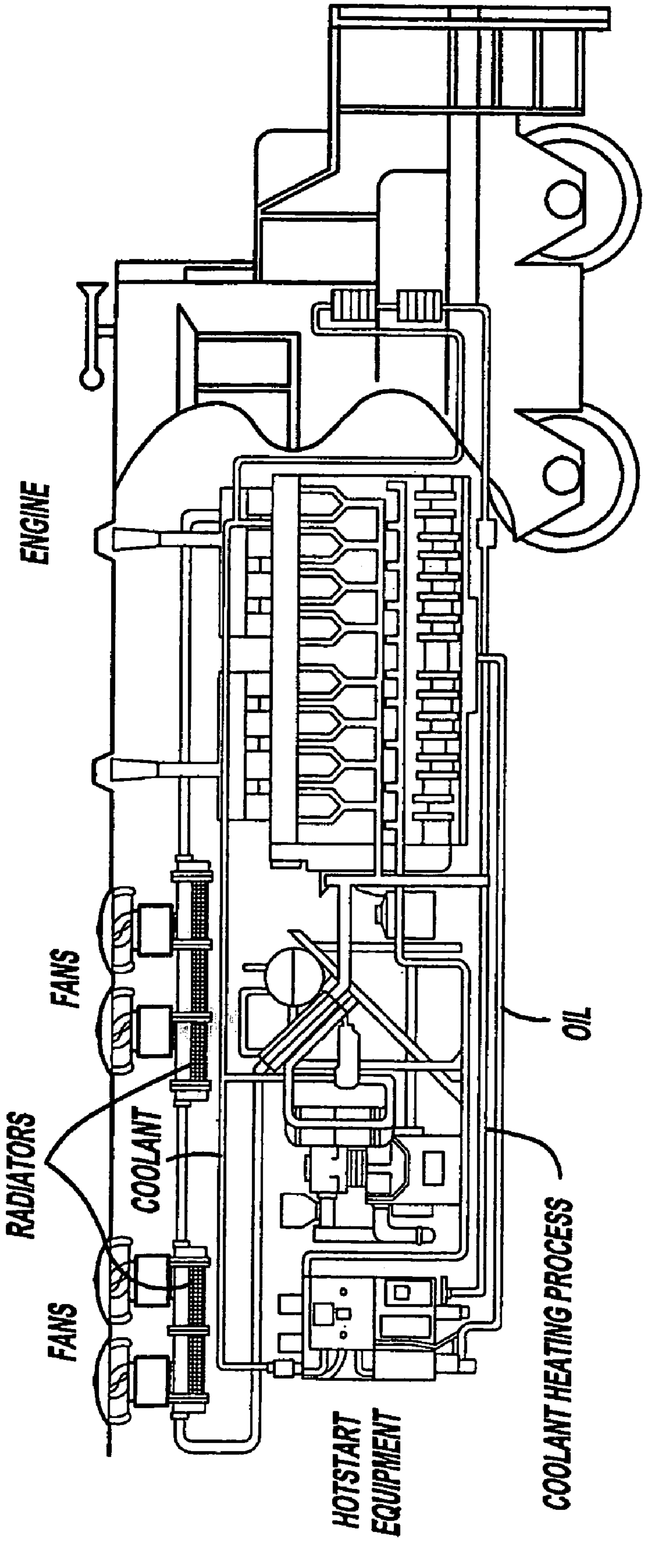
Figure - 5 Prior Art
FIG. 5 is a schematic view of an alternate prior art locomotive cooling system.

A system known as "Hotstart Layover Protection System for Diesel Locomotives" is disclosed at www.kimhotstart.com. In all "Hotstart" systems, a power source is supplying energy to heat the water and/or oil. A schematic of the process is shown in FIG. 5.

If idle operation of a wet locomotive cooling system in cold weather is not desired, a layover system could be used. In this case, the heat losses over the radiators can be large and costly. In order to reduce the heat losses at the radiators, the coolant flow rate through the radiators can be reduced (ideally to zero) by equating the pressures at the inlet and outlet of the radiators through the use of a fixed or variable orifice.

The present invention relates to a layover system with wet radiators. One embodiment is adapted for use in conjunction with a layover system such as that shown in FIG. 4. The present invention can be used with a conventional cooling system, such as that shown in FIG. 1, or a SAC system such as that shown in FIG. 2. In all these systems with wet radiators, there is coolant in the radiators. When the engine is stopped and the ambient temperature is low, the layover system operates. In this system, the coolant is heated by the layover heater and is circulating through the system either by forced circulation (with a coolant pump) or by natural convection.

In the wet radiator system, the heat loss through the radiators is a major heat loss and can be as big as and even larger than the heat loss at the engine. As this heat loss occurs without any useful heating for the engine, any reduction of this heat loss is desirable. The present invention minimizes this heat loss at the wet-type radiators of the layover system.

The heat loss at the radiators is a function of the water flow rate through the radiators. Thus, one method to minimize the heat loss at the radiators is to reduce the coolant flow rate through the radiators as much as possible and preferably to zero. Clearly, reducing the flow to zero will not reduce the heat loss to zero but will minimize it for the given radiator size and operating conditions. Reducing the flow through the radiator can be achieved by making the pressure at both ends of the radiator the same.

Figure 6:
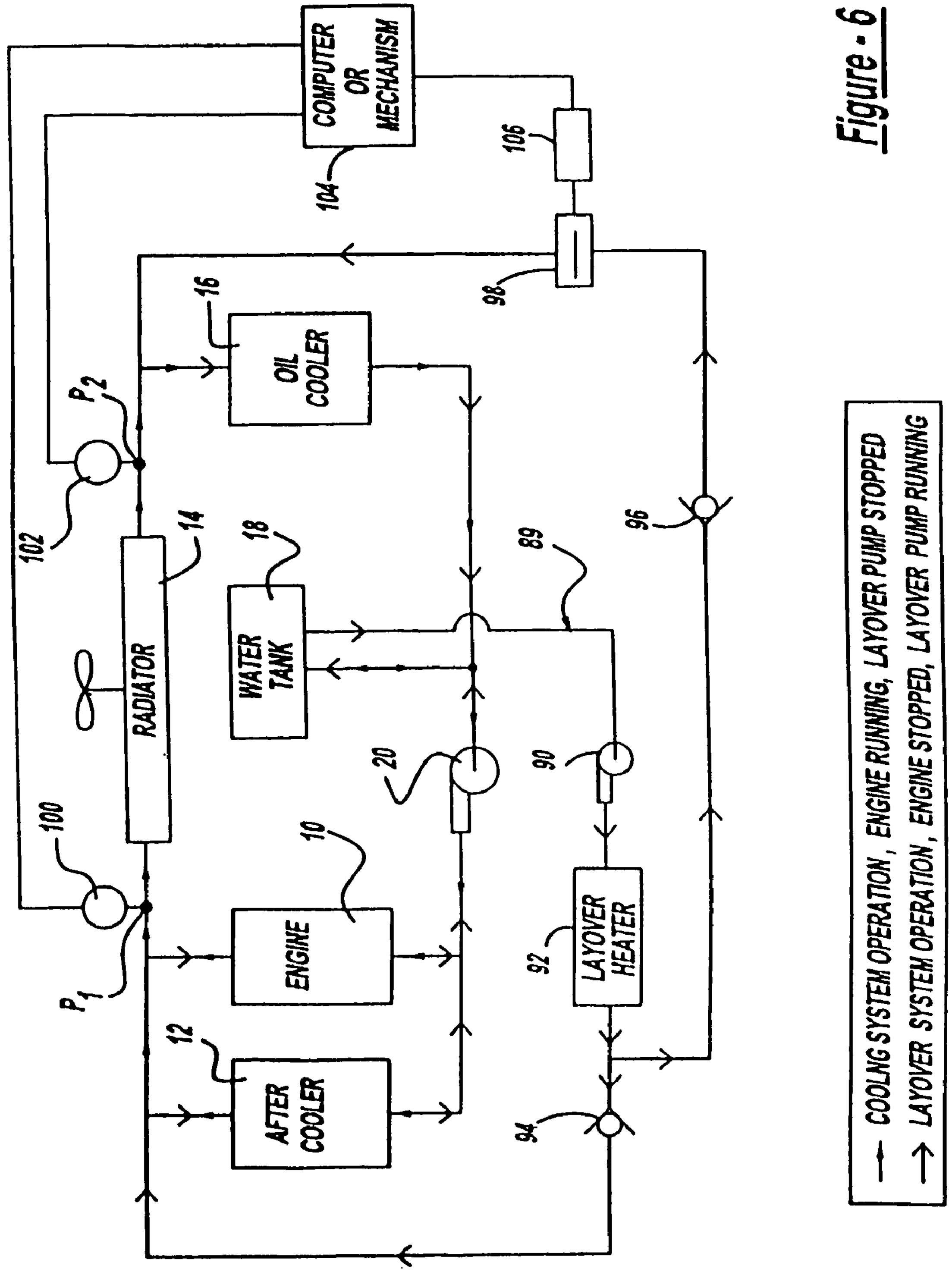
FIG. 6 is a schematic view of a layover heating system in accordance with one presently preferred embodiment the present invention.

In FIG. 6, the schematic arrangement of a layover system 89 of one presently preferred embodiment of the present invention is shown in connection with a conventional cooling system of the type shown in FIG. 1. The layover heating system 89 shown in FIG. 6 is shown on the same cooling system as that shown in FIG. 1 with the layover heating system 89 components added. Accordingly, like numbers will be used to designate similar components among the Figures. The system includes an engine 10, parallel aftercooler 12, radiator 14 and oil cooler 16. Radiator 14 is shown to include a fan. A water tank 18 is shown as is water pump 20. This embodiment shows the layover system 89 comprising: a layover pump 90, a layover heater 92, two check valves 94 and 96, and an orifice 98.

The operation of the system in engine operation mode is the same as described before for FIG. 1. In this mode, the lowest pressure point in the loop is at water tank 18. The installation direction of the check valves 94 and 96 prevents the flow from engine 10 out to water tank 18 and oil cooler 16 into water tank 18. The coolant flow direction in the coolant loop is as shown in FIG. 1 and is shown with narrow headed arrows.

When the engine 10 is stopped and the layover pump 90 is operating, the coolant flow directions will be as shown on FIG. 6 with broad headed arrows and described below. Layover pump 90 takes the water flow from the water tank 18 and passes it through the heater 92. A portion of the coolant heated at layover heater 92 goes through the check valve 94 and flows backward through the engine 10 and aftercooler 12 and main water pump 20 back to the water tank 18. The other portion of the coolant heated at heater 92 goes through check valve 96 and orifice 98 and then through oil cooler 16 back to the water tank 18. The pressure at both ends of the radiator (namely P1 and P2 in FIG. 6) is made generally equal or balanced by choosing the orifice 98 size properly. Thus, the flow rate through the radiator 14 is reduced to a very small value, and preferably, zero. As the layover pump 90 is going to be energized through a single speed electric motor, there will be one water flow rate through the components. As a consequence, it is possible to balance the pressures at the radiator with one orifice 98.

For different reasons, the speed of the electric motor may vary or the coolant flow rate in the layover heating loop may change for any reason. Under these conditions, the use of a fixed orifice 98 may not be able to equalize the pressure on both sides of the radiator P1 and P2. In such a case, the layover system 89 may include a variable size orifice 98 in place of fixed orifice 98. That is, either a fixed or variable sized orifice 98 may be used within the scope of the present invention. When a variable sized orifice 98 is used, The layover system 89 may also include sensors 100 and 102 to sense the respective pressures P1 and P2 on first and second side of the radiator, respectively, and generate signals to indicate the pressure (or temperature) differential between them.

Figure 8:
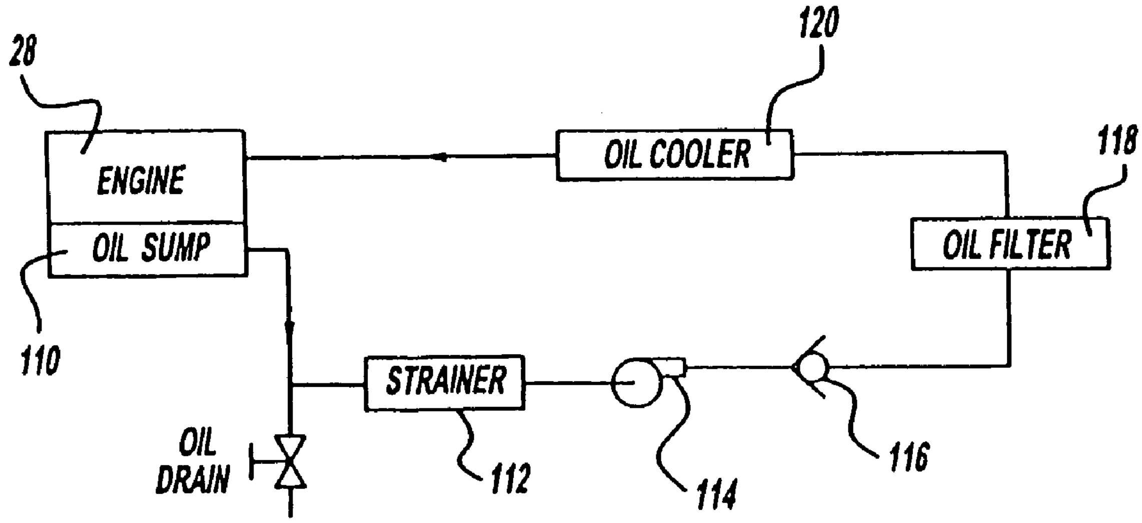
FIG. 8 is a schematic view of an oil cooling loop in accordance with one presently preferred embodiment of the present invention.

The signals are sent to a computer, central processing unit or other mechanism 104 capable of processing the signals. The central processing unit 104 calculates and generates the correction signal to reduce the pressure difference and sends the signal to actuator 106. Then, the actuator 106 changes the effective opening and the flow resistance of variable area orifice 98. This way, the pressure at both sides of the radiator can be generally equalized and the coolant flow through it is minimized. This will reduce the heat loss through the radiators to a minimum. Heating of the oil will be through the oil cooler as discussed above in connection with, for example, the system shown in FIG. 3*b*. This arrangement is shown schematically in FIG. 8. Specifically, the engine 28 includes an oil sump 110. The oil sump is in fluid communication with strainer 112. A standby oil pump is connected to the strainer 112. A check valve 116 is interposed between oil pump 114 and oil filter 118. The oil filter 118 is connected to the oil cooler 120. The oil cooler is in turn connected with the engine 28. Circulation of the oil is in the direction shown by the arrows in FIG. 8.

It will be appreciated that the components are shown in fluid communication through various plumbing. The plumbing may include tubes, pipes or any other structure that allows fluid communication between the respective components.

Figure 7:
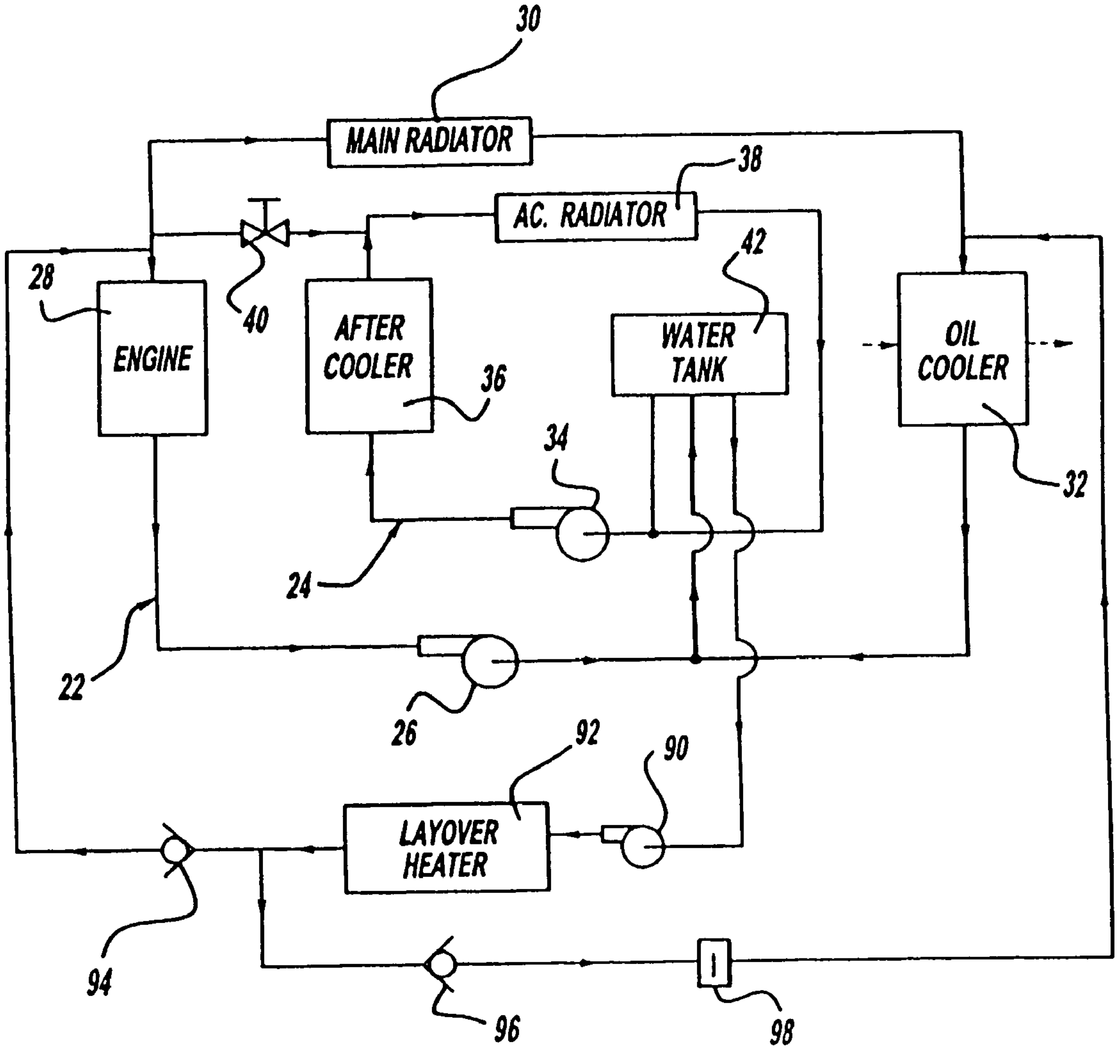
FIG. 7 is a schematic view of an alternate layover heating system in accordance with one presently preferred embodiment of the present invention.

FIG. 7 shows a SAC cooling system of the type shown in FIG. 2 with the layover system of the present invention added. The coolant flow direction is shown for the operation of the layover system with a fixed orifice. The coolant flow is in the direction of the arrows.

In essence, the SAC cooling system is as shown in FIG. 2 and the layover system is as shown in FIG. 6. Accordingly, like numerals will be used to refer to similar components. The system in FIG. 7 includes the two coolant loops of the SAC system, the engine coolant loop 22, and the after cooler loop 24. This embodiment also includes pump 26, engine 28, main radiator 30 on an oil cooler 32. These components are on the engine coolant loop 22. The after cooler loop 24 includes after cooler pump 34, after cooler cores 36 and after cooler radiator 38. Link valve 40 joins the coolant between the loops 22, 24. Water tank 42 is also included.

The layover system 89 is of the same type as that shown in FIG. 6. Operation of the layover system 89 is as discussed above. The layover system 89 comprises layover pump 90, layover heater 92, check valves 94, 94 and orifice 98. As above, orifice 98 may be fixed or of variable size. When a variable size orifice 98 is used, sensors and a central processing unit may also be included in the layover system 89. Similarly, an actuator may be used to control movement of the orifice 98.

The SAC cooling system shown in FIG. 7 operates the same as that discussed above with respect to FIG. 2 when the cooling system is in operation as the engine is running and the layover pump 90 is stopped. The layover system operation is the same as the layover system discussed above with respect to FIG. 6 when the engine is stopped and the layover pump 90 is running. Similarly, and as shown, the layover system 89 operates the same as that discussed above with respect to FIG. 6 when the layover system 89 is operational and the engine is stopped, with the layover pump running. Preferably, when the layover system 89 is operational, the link valve 40 is closed. The layover heating system operation is the same as that described above with respect to FIG. 6.

Other features of the cooling system (like oil side heating) remain the same. The operation conditions of the original system are not affected negatively and remain the same.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A layover heating system for a locomotive comprising: a water tank, a water pump and first plumbing extending therebetween;

an engine and second plumbing extending between the engine and the water pump;

an aftercooler and third plumbing extending between the aftercooler and the water pump;

a radiator and fourth plumbing extending between the engine and the radiator;

fifth plumbing extending from the aftercooler and connected to the fourth plumbing extending between the engine and the radiator;

an oil cooler and sixth plumbing extending between the radiator and the oil cooler;

seventh plumbing extending between the oil cooler and the water pump;

a layover pump and eighth plumbing extending between the water tank and layover pump;

a heater and ninth plumbing extending between the heater and the layover pump;

tenth plumbing extending from the electric heater and connected to the sixth plumbing extending from the radiator to the oil cooler, and a first check valve in the tenth plumbing, and an orifice in the tenth plumbing and intermediate the first check valve and the oil,cooler.

2. A layover heating system for a locomotive as set forth in claim 1 wherein said orifice is a variable orifice.

3. A layover heating system for a locomotive as set forth in claim 2 further comprising an actuator for operatively opening and closing the variable orifice.

4. A layover heating system for a locomotive as set forth in claim 3 further comprising a first pressure sensor in the fourth plumbing extending from the engine to the radiator and a second pressure sensor in the sixth plumbing extending from the radiator to the oil cooler and intermediate the radiator and the tenth plumbing.

5. A layover heating system for a locomotive as set forth in claim 4 further comprising a central processing unit and wherein the first and second pressure sensors are operatively connected to the central processing unit to provide signals thereto and wherein the actuator is operatively connected to the central processing unit to vary the orifice size based upon signals from the first and second sensors.

6. A layover system as set forth in claim 1 further comprising eleventh plumbing extending from the tenth plumbing that extends from the electrical heater to the plumbing extending from the radiator to the oil heater and connected to the fifth plumbing extending from the aftercooler to the plumbing extending from the engine to the radiator.

7. A layover system as set forth in claim 6 wherein the eleventh plumbing includes a second check valve therein.

8. A layover heating system for a locomotive engine adapted for connection with a locomotive cooling system having a water tank, an engine, a radiator and an oil cooler comprising:

a pump for circulating fluid from the water tank;

a layover heater in fluid communication with the pump;

at least one check valve in fluid communication with the layover heater;

an orifice for controlling the flow of fluid in the layover system; and a first pressure sensor for sensing the pressure on a first side of the radiator and a second pressure sensor for sensing pressure on a second side of the radiator.

9. A layover heating system for a locomotive as set forth in claim 8 wherein said orifice is a variable orifice.

10. A layover heating system for a locomotive as set forth in claim 9 further comprising an actuator for operatively opening and closing the variable orifice.

11. A layover heating system for a locomotive as set forth in claim 10 further comprising a central processing unit and wherein the first and second pressure sensors are operatively connected to the central processing unit to provide signals thereto and wherein the actuator is operatively connected to the central processing unit to vary the orifice size based upon signals from the first and second sensors, whereby the pressure on the first and second sides of the radiator can be controlled to control the flow of fluid through the radiator.

12. A layover heating method for a locomotive engine adapted for use in connection with a locomotive cooling system having a water tank, an engine, a radiator an oil cooler, and an orifice for controlling the flow of fluid to minimize fluid flow through the radiator, comprising:

pumping fluid from the water tank through a layover heater;

heating the fluid in the heater;

providing heated fluid to the engine and to the oil cooler; and sensing the pressure on first and second sides of the radiator with pressure sensors and adjusting the orifice to equalize the pressure on the first and second sides of the radiator to minimize fluid flow through the radiator.

13. A method as set forth in claim 12 further comprising, sending a signal from the pressure sensors to a central processing unit to generate a control signal, sending the control signal to an actuator to control movement of the orifice.

14. A method as set forth in claim 12 further comprising heating engine oil by circulating engine oil from the engine through an oil filter and the oil cooler having heated fluid therein and back to the engine.

15. A method as set forth in claim 14 further comprising circulating the engine oil by using an oil pump.

* * * * *